(12) United States Patent
Kordjazi et al.

(10) Patent No.: US 11,713,388 B2
(45) Date of Patent: Aug. 1, 2023

(54) TITANIUM DIOXIDE CATALYZED BUTADIENE POLYMER BASED OXYGEN SCAVENGING SYSTEM

(71) Applicant: Polyvalor, Limited Partnership, Montreal (CA)

(72) Inventors: Zahra Kordjazi, Montreal (CA); Abdellah Ajji, Mont-Royal (CA)

(73) Assignee: POLYVALOR, LIMITED PARTNERSHIP, Québec (CA)

( * ) Notice: Subject to any disclaimer, the term of this patent is extended or adjusted under 35 U.S.C. 154(b) by 0 days.

(21) Appl. No.: 17/082,722

(22) Filed: Oct. 28, 2020

(65) Prior Publication Data

US 2021/0130588 A1    May 6, 2021

Related U.S. Application Data

(60) Provisional application No. 62/928,043, filed on Oct. 30, 2019.

(51) Int. Cl.
*C08L 1/28* (2006.01)
*C08L 23/06* (2006.01)
*C08L 67/04* (2006.01)
*B32B 27/08* (2006.01)
*B32B 27/18* (2006.01)
(Continued)

(52) U.S. Cl.
CPC .............. *C08L 1/28* (2013.01); *B32B 27/08* (2013.01); *B32B 27/18* (2013.01); *B65D 65/40* (2013.01); *B65D 81/266* (2013.01); *C08L 23/06* (2013.01); *C08L 67/04* (2013.01); *B32B 2250/24* (2013.01); *B32B 2270/00* (2013.01); *B32B 2307/7242* (2013.01); *B32B 2307/7265* (2013.01); *B32B 2307/74* (2013.01); *B32B 2553/00* (2013.01); *C08L 2207/066* (2013.01)

(58) Field of Classification Search
None
See application file for complete search history.

(56) References Cited

U.S. PATENT DOCUMENTS 4,701,487 A * 10/1987 Hakim ................ C08K 5/20
106/316
5,211,875 A * 5/1993 Speer .................. B32B 27/306
252/188.28
(Continued)

FOREIGN PATENT DOCUMENTS

JP    2004161796    *    6/2004    ............. B65D 65/40

OTHER PUBLICATIONS

Davidson—The photodegradation of polyethylene an—Euro.Poly. J.+Citation—1981 (Year: 1981).*

(Continued)

*Primary Examiner* — John Vincent Lawler
(74) *Attorney, Agent, or Firm* — McLane Middleton, Professional Association

(57) ABSTRACT

A composition of matter having oxygen scavenging properties comprises a blend of a base polymer, a butadiene polymer, and titanium dioxide in an amount sufficient to catalyze reaction of oxygen with the butadiene polymer. In further aspects, methods for making the compositions herein and packaging film structures comprising the compositions herein, and packaging articles formed of the same, are also provided.

35 Claims, 6 Drawing Sheets

(51) Int. Cl.
*B65D 65/40* (2006.01)
*B65D 81/26* (2006.01)

(56) References Cited

U.S. PATENT DOCUMENTS

| | | | | |
|---|---|---|---|---|
| 5,344,869 | A | * 9/1994 | Seelert | C08L 23/02 |
| | | | | 524/505 |
| 6,083,585 | A | 7/2000 | Cahill et al. | |
| 2006/0000390 | A1 | * 1/2006 | Bolt | C04B 14/305 |
| | | | | 106/446 |
| 2009/0285511 | A1 | * 11/2009 | Aithani | B32B 7/12 |
| | | | | 383/200 |
| 2011/0281125 | A1 | 11/2011 | Chau et al. | |
| 2012/0217682 | A1 | * 8/2012 | Vignola | C08L 23/10 |
| | | | | 264/555 |
| 2016/0311949 | A1 | 10/2016 | Haberkorn et al. | |
| 2019/0270856 | A1 | * 9/2019 | Varadarajan | C08J 5/18 |

OTHER PUBLICATIONS

Dow—LLDPE—properties—2000 (Year: 2000).*
Anpo—2nd generation titanium oxide photocatalysts for UV—metal doping—2001 (Year: 2001).*
Xiao-e—IDS—light-driven oxygen scavenging by titania-polymer nanocomposite film—2004 (Year: 2004).*
Page—titania & silver-titania composite films on glass—2006 (Year: 2006).*
Cray_valley—hydroxyl-terminated polybutadiene—trans-cis-vinyl—Mn—2016 (Year: 2016).*
Kemp—TiO2 pigment on photodegrad of polymers (inc. polyolefins)—2000 (Year: 2000).*
Holtzen—TIO2 pigments—Charvat (ed.)—Coloring of Plastics—2004 (Year: 2004).*
Kitano—JP 2004-161796 A—MT—resin w-hydroxyl term, polybutadiene + metal-salt inc. Ti—2004 (Year: 2004).*
Busolo et al., "Oxygen scavenging polyolefin nanocomposite films containing an iron modified kaolinite of interest in active food packaging applications," Innovative Food Science and Emerging Technologies, vol. 16, pp. 211-217 (2012).
Serpone et al., "Size effects on the photophysical properties of colloidal anatase TiO2 particles: Size quantization versus direct transitions in this indirect semiconductor?" J. Phys. Chem., vol. 99, pp. 16646-16654 (1995).
Hitosugi et al., "Properties of TiO2-based transparent conducting oxides," Physica Status Solidi A, vol. 207, No. 7, pp. 1529-1537 (2010).
Mills et al., "Demonstration of a novel, flexible, photocatalytic oxygen-scavenging polymer film," Journal of Photochemistry and Photobiology A: Chemistry, vol. 177, No. 2, pp. 328-331 (2006).
Xiao-e et al. "Light-driven oxygen scavenging by titania/polymer nanocomposite films," Journal of Photochemistry and Photobiology A: Chemistry, vol. 162, No. 2, pp. 253-259 (2004).

\* cited by examiner

TITANIUM DIOXIDE CATALYZED BUTADIENE POLYMER BASED OXYGEN SCAVENGING SYSTEM

CROSS REFERENCE TO RELATED APPLICATION

This application claims the priority benefit of U.S. provisional application Ser. No. 62/928,043 file Oct. 30, 2019. The aforementioned application is incorporated herein by reference in its entirety.

BACKGROUND

The present invention relates to compositions of matter having oxygen scavenger capabilities and, in particular, to polymer compositions comprising a base polymer and a $TiO_2$ catalyzed butadiene polymer. The butadiene polymer is preferably polybutadiene (i.e., poly[buta-1,3-diene]), which may be modified (i.e., functionalized) or unmodified, i.e., (unfunctionalized). In certain embodiments, the butadiene polymer is an unfunctionalized polybutadiene. In certain embodiments, the butadiene polymer is a low molecular weight unfunctionalized polybutadiene. In certain embodiments, the butadiene polymer is a low molecular weight liquid unfunctionalized polybutadiene. In certain embodiments, the butadiene polymer is a butadiene homopolymer or butadiene copolymer.

In certain embodiments, the butadiene polymers are polybutadienes functionalized at terminal carbons (hereinafter referred to as "functionalized end group terminated" polybutadiene polymers). In certain embodiments, the functional groups of the functionalized polybutadiene are selected from hydroxyl, epoxy, and carboxyl groups. In certain embodiments, the polybutadiene is a low molecular weight functionalized end group polybutadiene. In certain embodiments, the functionalized end group polybutadiene is a low molecular weight liquid functionalized end group polybutadiene. In certain embodiments, the functionalized end group polybutadiene is hydroxyl terminated polybutadiene (HTPB), epoxy terminated polybutadiene, carboxyl terminated polybutadiene, or other functionalized end group terminated polybutadiene.

The oxygen scavenging compositions find utility in making articles of manufacture with oxygen scavenging characteristics. The compositions may advantageously be used for packaging applications. Articles of manufacture employing the composition include, for example, packaging or containers for foods, beverages, cosmetics, pharmaceuticals, personal care products, electronics, corrodible metals and products containing the same, and for any other products where a high degree of protection against oxygen is needed.

Oxygen causes various degrees of deterioration and failure modes in different products, such as electronic devices, food products, and products having corrodible metals. Packaging technologies are known that remove unfavorable substances including oxygen from the headspace of a package by absorption or scavenging. There are a number of different types of oxygen absorption systems. Most of the oxygen scavenging systems, such as iron powder-based scavengers, need moisture to activate the oxidation. See Busolo et al., "Oxygen scavenging polyolefin nanocomposite films containing an iron modified kaolinite of interest in active food packaging applications," *Innovative Food Science and Emerging Technologies*, Vol. 16, pp. 211-217 (2012); U.S. Publication No. 2011/0281125 entitled "Biodegradable polymer articles containing oxygen scavenger" (2011). Thus, one of the main drawbacks with most popular scavenging systems, such as metal powder, enzymes, or ascorbic acid, is the requirement for moisture presence to be activated or act properly, since such scavenging systems are not effective in dry conditions. Also known are some unsaturated organic scavenging systems that can be activated without the necessity of moisture presence. For instance, U.S. Pat. No. 5,211,875 discloses the use of unsaturated hydrocarbons such as 1,2-polybutadiene in the presence of a transition metal catalyst, such as cobalt neodecanoate, as an oxygen scavenger. In this system, radiation is applied to initiate oxygen scavenging, facilitate the oxidation, and decrease or eliminate induction time.

In U.S. Pat. No. 6,083,585, functionalized polybutadiene was applied to improve the dispersion of this unsaturated scavenger inside polyethylene terephthalate (PET) and to form a "true copolymer," rather than a mixture or physical blend of polybutadiene with polyester. In the '585 patent, cobalt octoate was used to increase the rate of oxygen absorption. U.S. Publication No. 2016/0311949 discloses composite materials with epoxy terminated polybutadiene prepared by melt extrusion used as oxygen scavengers in packaging applications. Epoxy end groups instead of hydroxyl terminated polybutadiene have the potential to react with various polymeric matrices such as ethylene vinyl alcohol (EVOH), polyamides, and polylactides rather than only reactive incorporation into polyethylene terephthalate (PET). In the '949 publication, cobalt stearate is used to catalyze the oxygen absorption process.

Although in such organic scavengers, moisture is not needed to activate the oxidation reaction, there remains a problem with these scavenging systems in that there are limitations in the amount of added scavenger substance that can be added while retaining good dispersion and transparency. Another problem with these scavengers is that oxygen absorption is limited by oxygen permeation into the polymeric matrix, since oxygen has to diffuse through the polymer until it reacts with the dispersed scavenger. Thus, the scavenging rate is very low and the kinetics of oxidation needs to be considered as an important issue. Even though using classical transition metal catalysts in organic scavenging systems reduces the induction time and increases the absorption rate, there are some issues associated with these classical catalysts, such as issues affecting transparency, mixing difficulties, and potential toxicity problems.

Photocatalytic activity of semiconductors, such as $TiO_2$, has attracted interest in the field of degradation of organic pollutants. $TiO_2$, as a well-known semiconductor photocatalyst, has been used in various industrial applications because of its excellent optical transmittance, chemical stability, and non-toxicity. Serpone et al., "Size effects on the photophysical properties of colloidal anatase $TiO_2$ particles: Size quantization versus direct transitions in this indirect semiconductor?" *J. Phys. Chem.*, Vol. 99, pp 16646-54 (1995); Hitosugi et al., "Properties of $TiO_2$-based transparent conducting oxides," *Physica Status Solidi A*, Vol. 207, No. 7, pp. 1529-1537 (2010). However, there is little research on the photocatalytic activity of $TiO_2$ in food packaging applications in which oxygen absorption has been investigated under direct UV radiation. Mills et al., "Demonstration of a novel, flexible, photocatalytic oxygen-scavenging polymer film," *Journal of Photochemistry and Photobiology A: Chemistry*, Vol. 177, No. 2, pp. 328-331 (2006); Xiao-e et al. "Light-driven oxygen scavenging by titania/polymer nanocomposite films," *Journal of Photochemistry and Photobiology A: Chemistry*, Vol. 162, No. 2, pp. 253-259 (2004). The requirement of a direct UV light triggering condition renders the prior art films generally inapplicable for food packaging structures to prevent degradation of food products.

The present disclosure contemplates a new and improved polymer compositions and packaging articles employing the same that overcome the above-referenced problems and others.

SUMMARY

The present development provides an efficient oxygen scavenging system based on unsaturated hydrocarbon oxidation, containing $TiO_2$ photocatalytic semiconductor.

In one aspect, a composition of matter having oxygen scavenging properties comprises a blend of a base polymer, a butadiene polymer, and titanium dioxide in an amount sufficient to catalyze reaction of oxygen with the butadiene polymer.

In a more limited aspect, the butadiene polymer comprises (i) a homopolymer of butadiene and/or (ii) a copolymer of butadiene.

In another more limited aspect, the copolymer of butadiene is a copolymer of butadiene and at least one monomer selected from the group consisting of isoprene, acrylonitrile, and styrene.

In another more limited aspect, the base polymer is ethyl cellulose.

In another more limited aspect, the composition is in a form selected from the group consisting of a solution cast film and a fibrous mat.

In another more limited aspect, the composition is prepared from a solvent mixture comprising the base polymer, the butadiene polymer, the titanium dioxide, and a solvent system, wherein the solvent system is selected from the group consisting a toluene/ethanol solvent system and an ethanol/water solvent system.

In another more limited aspect, the composition is prepared by a technique selected from the group consisting of solution casting and electrospinning.

In another more limited aspect, the composition is in the form of a fibrous mat having fibers with a diameter in the range of from about 0.3±0.1 microns to about 0.6±0.2 microns.

In another more limited aspect, the composition does not include a curing agent.

In another more limited aspect, the base polymer is a polyester.

In another more limited aspect, the polyester is polylactic acid (PLA).

In another more limited aspect, the composition is prepared by reactive melt extrusion of the polyester with the butadiene polymer and the titanium dioxide.

In another more limited aspect, the base polymer is a polyolefin.

In another more limited aspect, the polyolefin is low density polyethylene (LDPE).

In another more limited aspect, the polyolefin is linear low density polyethylene (LLDPE).

In another more limited aspect, the composition further comprises a hydrocarbon wax for improving dispersion of the butadiene polymer in the low density polyethylene.

In another more limited aspect, the composition is prepared by melt blending.

In another more limited aspect, the butadiene polymer is selected from the group consisting of unfunctionalized polybutadiene and a functionalized end group polybutadiene.

In another more limited aspect, the functionalized end group polybutadiene is selected from the group consisting of hydroxyl terminated polybutadiene (HTPB), epoxy terminated polybutadiene, and carboxy terminated polybutadiene.

In another more limited aspect, the functionalized end group polybutadiene is hydroxyl terminated polybutadiene having one or both of a relatively high trans content and a relatively low vinyl content.

In another more limited aspect, the hydroxyl terminated polybutadiene has a trans content of about 60%, a cis content of about 20%, and a vinyl content of about 20%.

In another more limited aspect, the titanium dioxide is present in an amount sufficient to catalyze reaction of oxygen with the butadiene polymer wherein moisture is not necessary to activate the reaction.

In another more limited aspect, the titanium dioxide is present in an amount sufficient to catalyze reaction of oxygen with the butadiene polymer in the absence of direct ultraviolet radiation.

In another more limited aspect, the butadiene polymer has a number average molecular weight (Me) in the range of from about 500 to about 5,000.

In another more limited aspect, the butadiene polymer has a number average molecular weight (Me) in the range of from about 1,000 to about 3,000.

In another more limited aspect, the composition further includes a UV or visible light photoinitiator.

In another more limited aspect, the UV or visible light photoinitiator is selected from the group consisting of benzophenone, acetophenone, valerophenone, or titanocene.

In another more limited aspect, the titanium dioxide is doped with a doping agent selected from the group consisting of noble metal, a transition metal, and a non-metal.

In another aspect, a packaging film structure includes an oxygen scavenging layer comprising a blend of a base polymer, a butadiene polymer, and titanium dioxide in an amount sufficient to catalyze reaction of oxygen with the butadiene polymer.

In a more limited aspect, the packaging film structure, further includes one or both of an outer layer and a heat sealant layer.

In another more limited aspect, one or both of the outer layer and a heat sealant layer comprises the base polymer.

In another more limited aspect, the packaging film structure further includes a barrier layer selected from a gas barrier layer and a moisture barrier layer.

In further aspects, methods for making the compositions herein and articles of manufacture comprising the compositions herein are provided.

In still further aspects, packaging articles are formed of the film compositions and structures disclosed herein.

One advantage of the present development resides in the ability to produce packaging structures by a number of methods, including solution casting, electrospinning, melt extrusion, and reactive melt extrusion.

Another advantage of the present invention is that it uses $TiO_2$ as a non-toxic and chemically stable photocatalyst, which is suitable for food packaging applications, thereby addressing toxicity issues associated with transition metal catalysts utilized in prior art oxygen scavenging materials.

Yet another advantage of the present development is seen in the clarity and transparency of the prepared films.

Still further advantages and benefits of the present invention will become apparent to those of ordinary skill in the art upon reading and understanding the following detailed description of the preferred embodiments.

BRIEF DESCRIPTION OF THE DRAWINGS

The invention will be better understood by reference to the figures of the drawings, wherein.

DETAILED DESCRIPTION OF THE PREFERRED EMBODIMENTS

Figure 1A:
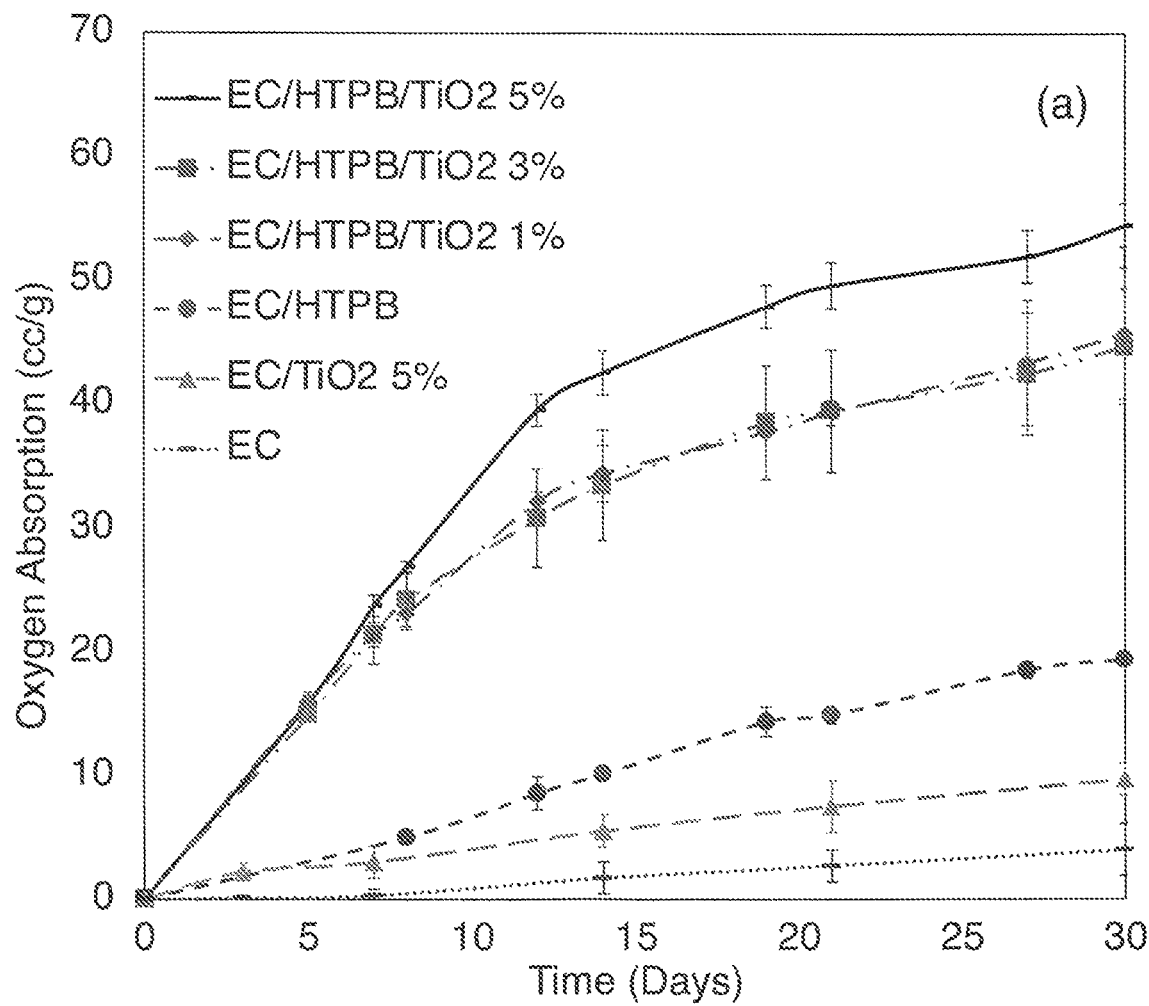
FIG. 1A is a graph of oxygen absorption versus time for EC/HTPB/TiO$_2$ solution casting films, prepared in toluene/ethanol mixture.

The present invention relates to compositions of matter, and articles of manufacture which can be manufactured therefrom, having oxygen scavenger capabilities. The compositions of the invention may be used for manufacturing packaging materials and containers for food, beverage, cosmetics, pharmaceuticals, personal care products, electronics, products containing corrodible metals, and other products, intermediate components thereof, and inserts therefor, all with improved oxygen scavenging properties.

The disclosed compositions provide a versatile oxygen scavenging system for packaging applications. Generally, the compositions comprise a base polymer, a butadiene polymer, and titanium dioxide. Exemplary butadiene polymers include unfunctionalized polybutadiene, hydroxyl terminated polybutadiene, epoxy terminated polybutadiene, carboxy terminated polybutadiene, or other functionalized end group terminated polybutadiene. In certain embodiments, the butadiene polymer is a butadiene copolymer. In certain embodiments, the butadiene polymer is a low molecular weight polybutadiene polymer. Preferably, the butadiene polymer is liquid (e.g., at room temperature) low molecular weight polybutadiene. The use of liquid low molecular weight butadiene polymers results in higher oxygen scavenging efficiency. In certain embodiments, the butadiene polymer is present in an amount of from about 5 to about 30 percent by weight, preferably about 6 to about 25 percent by weight, and more preferably about 10 to about 20 percent by weight based on the weight of the composition. For the solution techniques, including the solution casting and electrospinning techniques as described in greater detail below, the titanium dioxide is present in an amount of from about 1 to about 5 percent, preferably about 2 to about 4 percent, e.g., about 3 percent, by weight to the total weight of the blend. For the melt techniques, including the melt extrusion and reactive melt extrusion techniques as described in greater detail below, the titanium dioxide is present in an amount of from about 1 to about 5 percent, preferably about 2 to about 4 percent, e.g., about 3 percent, by weight to the weight of the butadiene polymer.

Base Polymer

A variety of different polymers can be used as the base polymer. In certain embodiments, the base polymer is a polymer or blend of polymers commonly used in packaging materials. In certain embodiments, the polymer grade with higher oxygen permeability is preferred, for example low density polyethylene (LDPE) instead of high density polyethylene (HDPE). In certain embodiments, the base polymer composition is a blend of two or more polymers. Examples of such polymers include polyolefins, including polyethylene, e.g., low density polyethylene, very low density polyethylene, ultra-low density polyethylene, high density polyethylene, and linear low density polyethylene, and polypropylene; polyesters such as polyethylene terephthalate (PET), polyethylene naphthalate (PEN) and their copolymers, including polyester copolymers wherein cyclohexane dimethanol (CHDM) replaces some of the ethylene glycol units in the polymer backbone (e.g., PETG) and/or polyester copolymers wherein isophthalic replaces some of the terephthalic acid units in the polymer backbone (e.g., PETA). In certain embodiments, the base polymer preferably has a high rate of oxygen permeability, such as LDPE. Other polymers include cellulose based polymers, including without limitation ethyl cellulose (EC), and aliphatic polyesters, including without limitation polylactic acid (PLA). In certain embodiments, e.g., wherein the butadiene polymer is an epoxy end group terminated polybutadiene, the base polymer can be a polyamide such as Nylon, e.g., polyamide 6 (PA6), polyamide 66 (PA66), or a blend thereof.

1. Ethyl Cellulose Base Polymer

In certain embodiments, the base polymer is ethyl cellulose (EC). EC is a biodegradable polymer with high permeability to oxygen, which makes it a good option as the matrix for oxygen absorption by HTPB. EC has hydroxyl or ether groups that can support the formation of new hydrogen bonding between the remaining hydroxyl groups or ether groups of EC and the hydroxyl end groups of HTPB. A solution mixing method was utilized to prepare the required mixtures for the preparation of (1) polymer films comprising the oxygen scavenging compositions herein by solution casting; and (2) polymer fibers comprising the oxygen scavenging compositions herein by electrospinning. Exemplary solvent systems include toluene/ethanol mixtures and ethanol/water mixtures. It has been found that both toluene/ethanol mixtures and ethanol/water mixtures can advantageously be used to prepare fibers formed of the presently disclosed oxygen scavenging polymer compositions wherein the base polymer is EC via an electrospinning process. In the case of polymer films prepared by solution casting wherein EC is the base polymer, it has been found that a toluene/ethanol mixture is preferable since it provides a higher quality film than ethanol/water. One of the novel aspects of the present development is that it provides a method for solidifying the butadiene polymer in EC without the need to add a curing agent.

Electrospinning is a technology for manufacturing thin polymer fibers based on the principle of spinning polymer solutions in a high-voltage electric field. It consists of the ejection, from the end of a capillary tube, of a charged jet of a liquid polymer, such as a polymer solution (or molten polymer), which is elongated and accelerated by an external field. One innovation of the present method is that it allows the solidification of HTPB in EC without adding a curing agent. The present inventors are also not aware of any report on applying an electrospinning method to produce nanofiber mats for oxygen scavenging applications. It has been found that electrospun mats in accordance with this disclosure advantageously find utility as an oxygen scavenging pad that can be used inside a package, e.g., applied to the inside of the lid of a container. Although polymer fibers in accordance with the present development are disclosed herein primarily by way of reference to electrospinning which is the presently preferred method for producing polymer fibers comprising the oxygen scavenging compositions herein, it will be recognized that such fibers can be produced by other methods as well, including blowing, e.g., solution blow spinning (SBS) and melt spinning, blend spinning, and phase separation techniques, as would be understood by persons skilled in the art.

In order to study the stability and homogeneity of the EC/HTPB in ethanol/water mixture utilized for the electrospinning process, viscosity and Fourier transform infrared (FTIR) measurements were carried out. Applicability of Cox-Merz empirical rule between the steady state shear viscosity and the magnitude of complex viscosity as a function of shear rate and angular frequency, respectively, indicate that the electrospinning solution prepared in ethanol/water was homogenous, even in the presence of HTPB and $TiO_2$. FTIR spectra showed a similar ratio of EC to HTPB in electrospun mat compared to cast film, which reveals the stability of the solution in the syringe during the electrospinning process.

Ethyl cellulose (EC), 48% ethoxy, with the viscosity of 10 cP, from Sigma Aldrich and hydroxyl terminated polybutadiene (HTPB) R-45HTLO from Total Cray Valley (60% trans, 20% cis and 20% vinyl content, number average molecular weight $M_n$=2800) are used as polymeric phases. $TiO_2$ (purity>99.5%, trace metal basis) with 21 nm primary particle sizes, toluene (99.9%) and ethanol (99.9%) were purchased from Sigma Aldrich. Deionized water was used in all experiments.

Solution mixing was used to prepare blends of EC and HTPB for both solution casting and electrospinning. For solution casting, HTPB was added to a solution of 5% by weight (g) of EC to the volume (cc) of a binary solvent system of toluene and ethanol 80/20 (v/v), with the weight to volume ratio of EC/HTPB equal to 0.75/0.25 (g/cc) and stirred for 2 hours.

Polymer films were prepared by a typical film casting method. Solution mixtures in aluminum pans were dried by solvent evaporation under a fume hood for 5 hours. A digital micrometer was used to measure film thickness. The average thickness of the cast films was around 200 microns. Dried films were placed in a vacuum oven at 50 degrees C. for 24 hours, to extract moisture and solvent traces.

For electrospinning, solutions with 5, 10, 15 and 20% (weight (g) to volume (cc)) of EC in two different solvent mixtures, namely, toluene/ethanol and ethanol/water mixtures, with the weight to volume ratio of EC/HTPB equal to 0.75/0.25 (g/cc), were prepared. The volume ratio of toluene to ethanol in the toluene/ethanol mixture was 80/20 (v/v). The volume ratio of ethanol to water in the ethanol/water mixture was likewise 80/20 (v/v).

For the binary mixture of water/ethanol, stirring was continued overnight and the resulting solution was opaque. It should be noted that at a lower ratio of EC/HTPB (e.g., lower than 60/40 (g/cc)) it was not possible to obtain completely solidified cast film. However, at this quantity of HTPB incorporated into the EC mixture 0.75/0.25 (g/cc), prepared films and mats were truly solidified.

Finally, $TiO_2$ (1-5 percent by weight to the total weight of the blends) was added to all solutions and mixing continued for an extra 2 hours.

The electrospinning set up employed a high voltage power supply, a syringe (plastic syringe for ethanol/water and glass one for toluene/ethanol mixtures), a syringe pump, a 21-gauge needle (OD 0.82 mm and ID 0.51 mm) and a collector. The solutions were fed into the needle through the mounted syringe on the syringe pump with a solution flow rate of 2.4 ml/hr. In all experiments, 20 kV was applied to the collector, and the grounded needle was placed 125 mm far from the collector. All dried films and electrospun fibers were placed in a vacuum oven at 50 degrees C. to extract moisture and solvent traces for 24 hours.

Oxygen absorption measurements were carried out on EC/HTPB/$TiO_2$ prepared by solution casting and electrospinning. The concentration of oxygen inside a closed container was measured using an OpTech-$O_2$ platinum oxygen analyzer (MOCON, Minneapolis, Minn.). This analyzer is a non-destructive technique comprising an optical sensor based on platinum fluorescent chemistry that adheres inside the container and a handheld probe connected to data acquisition software that measures the oxygen concentration.

Film specimens and fibrous mats were cut into desired weight and placed in a glass bottle tightly sealed. The optical sensor adhered inside the wall of the flask, and finally, the system was tightly sealed. The oxygen concentration inside the container was measured as a function of time, and the amount of oxygen absorption was calculated by subtracting the final concentration of initial concentration.

Figure 1B:
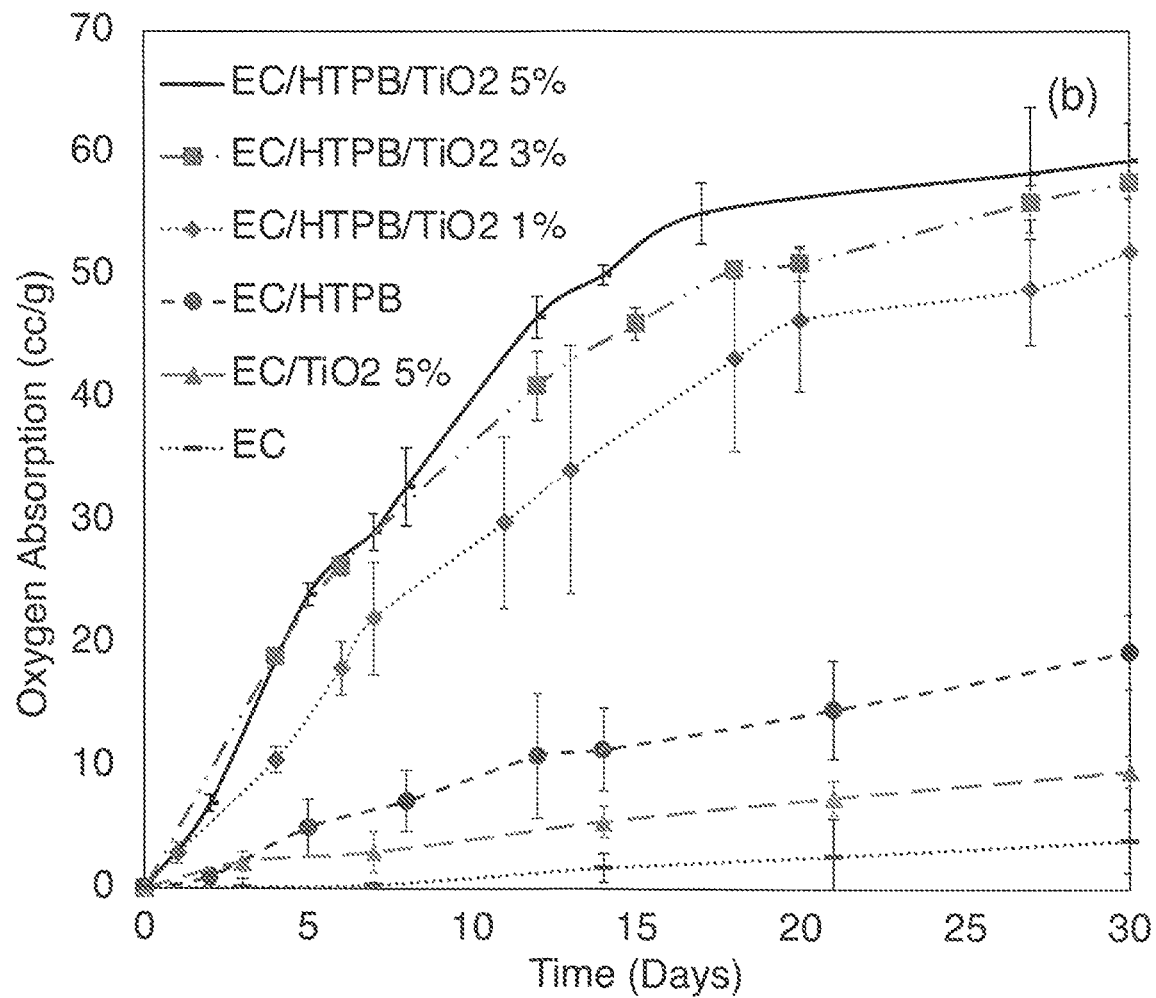
FIG. 1B is a graph of oxygen absorption versus time for EC/HTPB/TiO$_2$ electrospun fibrous mats, prepared in ethanol/water mixture.

FIG. 1A is a graph of oxygen absorption versus time for EC/HTPB/$TiO_2$ solution casting films, prepared in toluene/ethanol mixture. FIG. 1B is a graph of oxygen absorption versus time for EC/HTPB/$TiO_2$ electrospun fibrous mats, prepared in ethanol/water mixture. Weight to volume ratio of EC/HTPB is 0.75/0.25 (g/cc) in all compositions, and 1-5 percent by weight $TiO_2$ was added to the total weight of the blends.

Oxygen absorption measurements were carried out on EC/HTPB/$TiO_2$ samples prepared from solution casting (films) in toluene/ethanol mixture and electrospinning methods (mats) in ethanol/water mixture. FIGS. 1A and 1B represent the amount of absorbed oxygen per gram of sample, while 1 gram of each sample was placed in a closed container (275 cc volume) for 30 days. The weight to volume ratio (w/v) of EC/HTPB was equal to 0.75/0.25 (g/cc), and 1-5 percent by weight $TiO_2$ was added to the total weight of the blends.

Although all samples, even pure polymeric matrix (EC) without HTPB, showed some extent of oxygen absorption, it was almost negligible for the pure EC. It can be observed that $TiO_2$ addition as photocatalytic semiconductor increased the oxygen absorption rate of the pure sample. The results show that blending with HTPB has significantly increased the absorption rate, while $TiO_2$ catalyzed this oxidation reaction. Owing to the higher surface area in comparison with cast films, the efficiency of fibrous mats is about 10% higher than that of cast films. However, due to the high oxygen permeability of EC as the polymeric matrix, even cast films showed absorption comparable with electrospun mats. The final absorption for cast and electrospun samples were about the averages of 54 cc/g and 59 cc/g, respectively, after 30 days at 5% catalyst by weight, respectively.

2. Polyester Base Polymer

In certain embodiments, the base polymer is polylactic acid (PLA). PLA is a biodegradable polyester with carboxylic groups at the chains end and is, therefore, a good choice for reactive melt blending with HTPB. It will be recognized that any other polymeric matrix with or without a hydrocarbon wax, that could be blended through reactive melt extrusion with HTPB could be utilized as the polymer base of the present compositions. An efficient extrusion is required to reach a proper dispersion and distribution of $TiO_2$ particles as well as uniform reactive melt blending HTPB with PLA. Single layer and multi-layer films can be prepared using cast film and blown film preparations.

Polylactic acid (PLA) 2003D from NatureWorks and hydroxyl terminated polybutadiene (HTPB) R-45HTLO from Total Cray Valley (60% trans, 20% cis and 20% vinyl content, molecular weight $M_n=2800$) were used as polymeric phases and $TiO_2$ (>99.5%, trace metal basis) with 21 nm primary particle sizes from Sigma Aldrich was used as the catalyst. Single layer films were prepared using cast film preparation.

A fully intermeshing co-rotating twin screw extruder with 18 mm screw diameter and length to diameter (L/D) ratio of 40 was used to prepare the compound and cast films. For compounding, a circular die (2 mm diameter) was mounted on the barrel exit, and a water bath was employed to cool the extruded filament. The continuous extruded was led directly into pelletizer.

For cast film preparation, the circular die was replaced by a slit die followed by cooling with an air knife. Films were stretched with chill rolls at ambient temperature to the desired thickness (65±10 micron). To diminish the effect of thickness on our characterizations, films with approximately the same thickness were chosen for all measurements.

PLA was initially dried before compounding with HTPB for 24 hours in a vacuum oven at 60° C. To compound PLA with HTPB, PLA was fed into the hopper, and a side feeder was connected to feed liquid HTPB into the twin-screw extruder. The side feeder's flow rate was calibrated by adjusting the PLA feeding rate in hopper against HTPB liquid feeding rate by side feeder. The HTPB contained 5 weight percent $TiO_2$ in all extrusion compounds and the HTPB composition was 13 wt % in PLA/HTPB blend in compounding. The screw speed was 150 rpm and the temperature profile was set at 175/180/185/185/190° C., from hopper to die.

To process single layer cast film from the prepared PLA/HTPB compound, initial composition (13 wt % HTPB) and diluted compounds to 10 wt % and 6 wt % HTPB were fed to the hopper. Also, a film sample from pure PLA was prepared as a control sample. The screw speed was 150 rpm and the temperature profile was set at 175/180/185/185/190° C., from hopper to die. The average film thickness was 65±10 micron.

Oxygen absorption measurements were carried out on PLA/HTPB/$TiO_2$ films prepared by melt extrusion. Measuring the concentration of oxygen inside a sealed glass container was performed using an OpTech-$O_2$ platinum oxygen analyzer (MOCON, Minneapolis, Minn.). This analyzer applies a non-destructive technique in which an optical sensor based on platinum fluorescent chemistry adheres inside the container and a handheld probe connected to data acquisition software measures the oxygen inside the container. Film specimens were placed into glass containers in which an optical sensor adhered inside the wall of the container, and the system was tightly sealed. The oxygen concentration inside the container was measured, as a function of time, and the amount of oxygen absorption was calculated by subtracting the final concentration of initial concentration.

To be able to compare the results, films with approximately the same thickness were selected and cut in a way to have identical weight (1 g) for all samples; also, all bottles had the same volume (275 cc).

Figure 2:
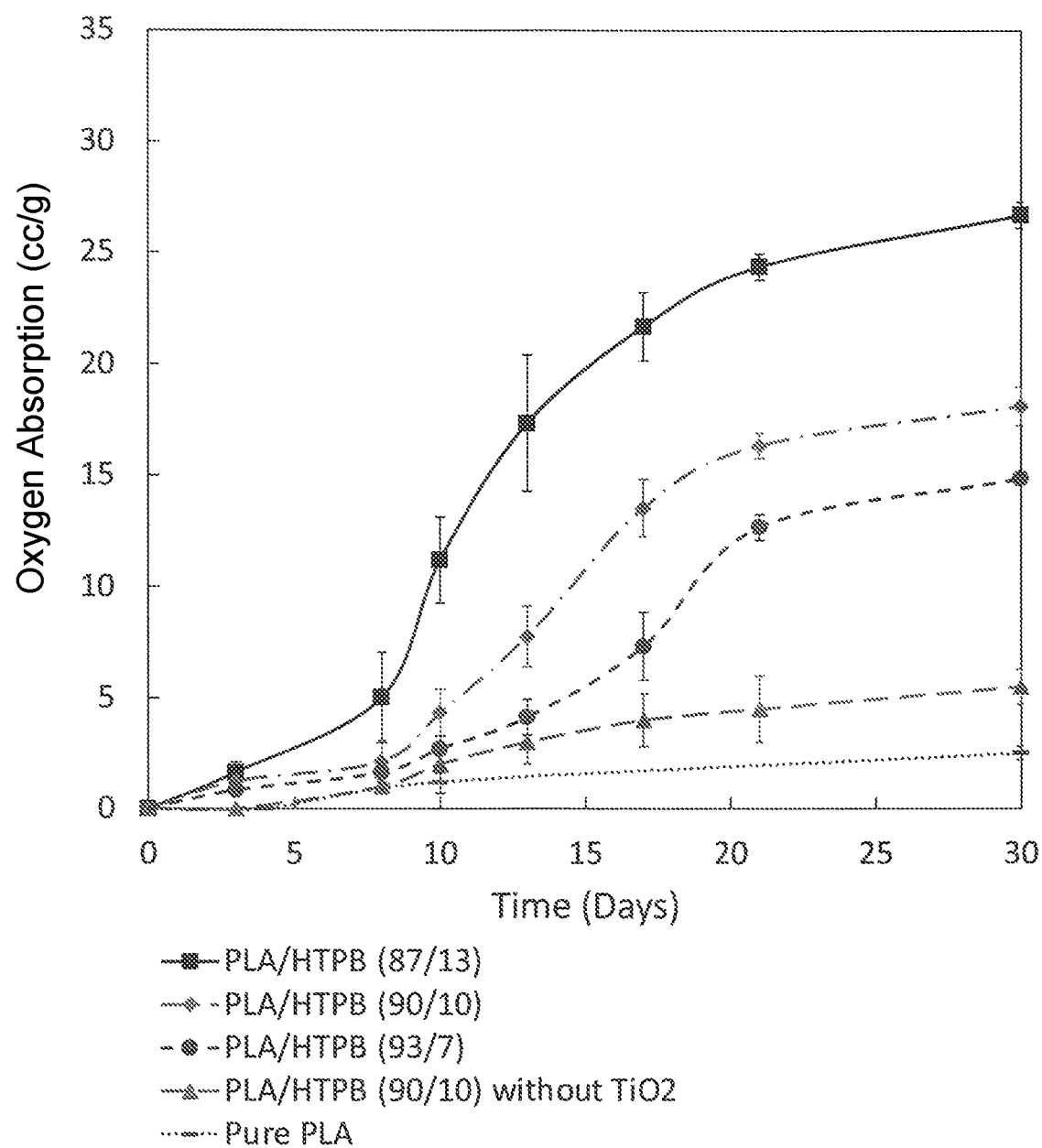
FIG. 2 is a graph of oxygen absorption versus time for three PLA/HTPB/TiO$_2$ extrusion films comprising 5% by weight TiO$_2$ to the weight of HTPB. Oxygen absorption was also measured for a first control film comprising pure PLA and a second control film comprising PLA/HTPB without TiO$_2$.

FIG. 2 shows the amount of absorbed oxygen per gram of oxygen scavenging films, for 30 days. The weight ratios of PLA and HTPB in the films were as shown in Table 1:

TABLE 1

| PLA | HTPB |
| --- | --- |
| 87 | 13 |
| 90 | 10 |
| 93 | 7 |
| 100 | 0 |

In all compositions, $TiO_2$ was present in the amount of 5% by weight to the weight of HTPB. It is seen that the absorption rate and amount increased with increasing HTPB. The final absorption was about an average of 27 cc/g after 30 days for the films containing 13% HTPB in PLA.

3. Polyolefin Base Polymer

LDPE, as one of the most common polyolefins, is an appropriate choice for melt blending with HTPB. LDPE 611A from Dow Chemical was used as base polymer. To solve incompatibility or miscibility issues between LDPE and HTPB and improve blending and stability, a hydrocarbon wax was included to improve the dispersion of HTPB in the LDPE polymer base. An efficient extrusion is required to reach a proper dispersion and distribution of $TiO_2$ particles as well as uniform melt blending HTPB with LDPE. Melt extrusion of HTPB containing $TiO_2$ with the wax was followed by melt blending with LDPE. It will be recognized that HTPB may be blended with high melt flow index (MFI) PE without the addition of wax. In certain embodiments, the wax composition in the compound is between 0 to 20% by weight. Single layer and multi-layer films can be prepared using cast film and blown film preparations.

For LDPE/HTPB compounding, to prevent phase separation, Sasol hydrocarbon wax was added. Melt compounding of LDPE and HTPB was carried out in twin screw extruder in two steps. First step, Sasol wax was fed into the feeder, and liquid HTPB (containing 5% $TiO_2$) was added through the side feeder such that the final ratio of Sasol wax to HTPB equals 2:1. The screw speed was 25 rpm, and the temperature profile was set at 95/100/110/100/95 degrees C. from hopper to die. The Sasol wax/HTPB compound was ground to the powder form and was added in the second step to LDPE by side feeder. The temperature profile for the LDPE/Wax/HTPB compound from the hopper to die was 175/180/180/185/185 degrees C., and the screw speed was 100 rpm. The initial composition of HTPB and wax in LDPE/wax/HTPB compound was 10 wt % and 20 wt %, respectively.

The ratio of hydrocarbon wax to HTPB in the compound may be changed by changing the MFI of the PE. By replacing LDPE with LLDPE having an MFI of 20 g/10 min, melt compounding of high MFI LLDPE (e.g., MFI of 20 g/10 min) may be carried out in one step without the addition of Sasol wax.

To prepare single layer cast films from the prepared LDPE/Wax/HTPB compound, initial composition (10 wt % HTPB) and diluted compounds to 8 wt % and 6 wt % HTPB was fed to the hopper. Also, pure LDPE film was prepared as a control sample. The temperature profile from the hopper to die was 175/180/180/185/185 degrees C., and the screw speed was 100 rpm. The average film thickness was 65±10 micron.

To be able to compare the results, films with approximately the same thickness were selected and cut in a way to have identical weight (1 g) for all samples. Also, all bottles had the same volume (275 cc).

For blown film preparation, the co-extrusion process was used. Two extruders with 20 mm screw diameter and length to diameter (L/D) ratio of 30 were used to prepare single and three-layer blown films. A circular blown film die with 50 mm diameter and 1.5 mm die gap was used to prepare single and three-layer blown films. External air cooling was employed to cool the blown film. The blow-up ratio was set at 4. The average thickness for single layer blown film was 60±10 micron. The total average thickness for three-layer blown films was 40±10 micron and the layers had approximately the same thickness. To diminish the effect of thickness on our characterizations, films with approximately the same thickness were chosen for all measurements.

To prepare single layer blown films from LDPE/Wax/HTPB compound, initial composition (10 wt % HTPB comprising 5 wt % TiO$_2$ to the weight of HTPB) was fed to the hopper. The temperature profile from the hopper to die was 180/180/190/190 degrees C., and the screw speed was 60 rpm. The average film thickness was 60±10 micron.

Figure 4:
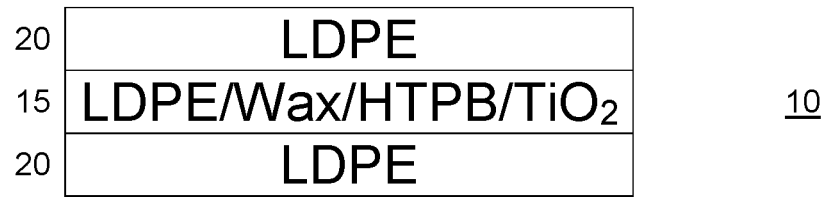
FIG. 4 is a schematic illustrating the order of layers for a three-layer blown film structure comprising two layers of LDPE and a core layer of LDPE/Wax (optional)/HTPB/TiO$_2$ composition.

To prepare three-layer blown films 10 having a structure of LDPE as skin layers 20a, 20b and LDPE/Wax/HTPB composition 15, which comprises 10 wt % HTPB (the HTPB component, in turn, comprises 5 wt % TiO$_2$ based on the weight of the HTPB component) as the core layer as illustrated in FIG. 4, two extruders were used. The temperature profile from the hopper to die was set at 180/180/190/190 degrees C. for both extruders and the screw speeds were 40 and 20 rpm for the LDPE extruder (skin layers 20a, 20b) and LDPE/Wax/HTPB extruder (core layer 15), respectively, to reach the same thickness for each of the layers. The average total film thickness was 40±10 microns with each layer having approximately the same thickness.

Figure 3:
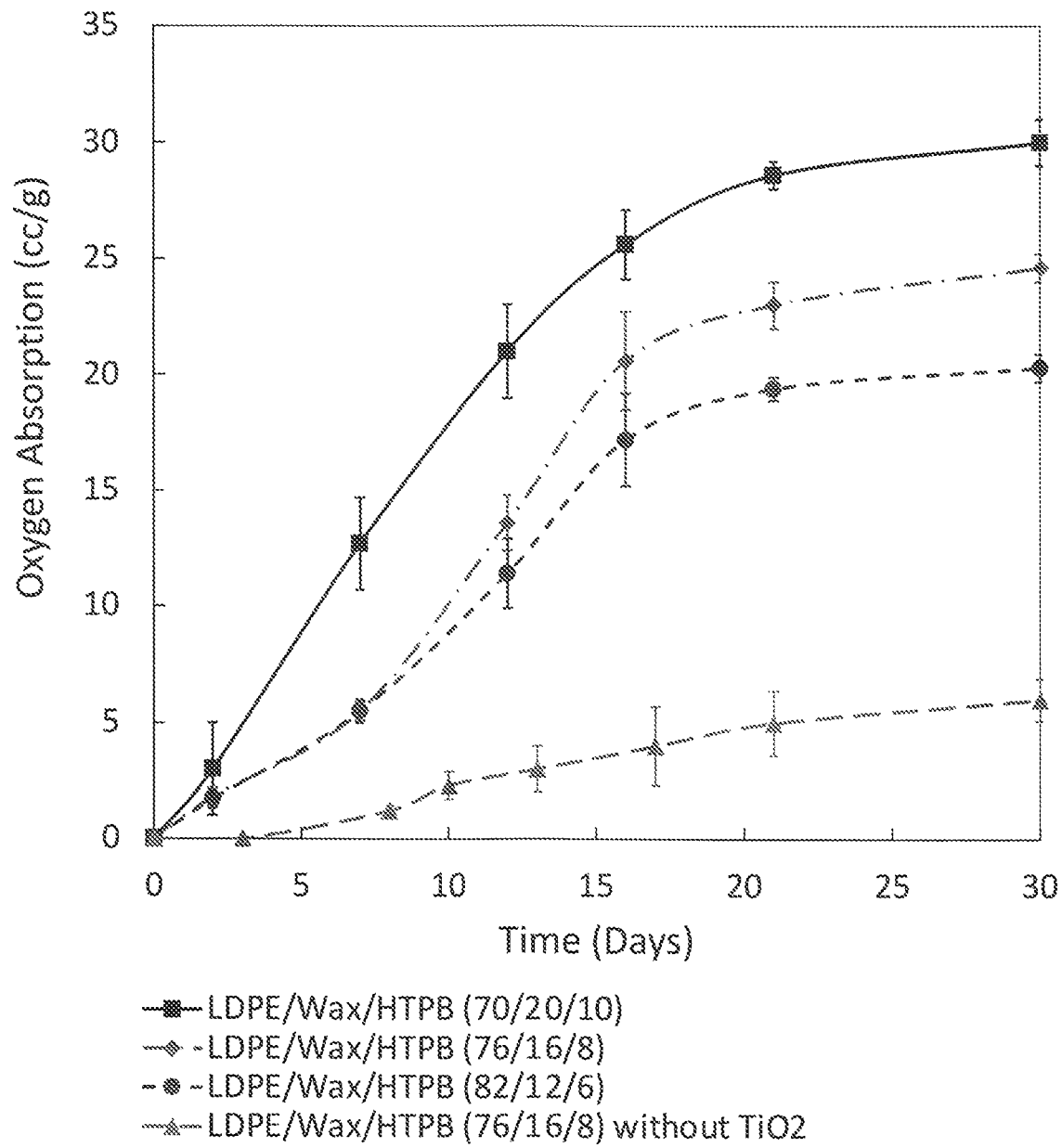
FIG. 3 is a graph of oxygen absorption versus time for three LDPE/Wax/HTPB/TiO$_2$ extrusion films comprising 5% by weight of TiO$_2$ to the weight of HTPB and a control film comprising LDPE/Wax/HTPB without TiO$_2$.

Oxygen absorption measurements were carried out on LDPE/Wax/HTPB/TiO$_2$ cast films prepared by melt extrusion in the manner described above for the PLA/HTPB/TiO$_2$ films. FIG. 3 shows the amount of absorbed oxygen per gram of oxygen scavenging films, for 30 days. The weight ratio of LDPE and HTPB in the films were as shown in Table 2, below:

TABLE 2

| LDPE | Wax | HTPB |
|---|---|---|
| 82 | 12 | 6 |
| 76 | 16 | 8 |
| 70 | 20 | 10 |

In all compositions, TiO$_2$ was present in the amount of 5% by weight to the weight of HTPB in all compositions. It is seen that the absorption rate and amount increased with increasing HTPB. The final absorption was about an average of 30 cc/g after 30 days for the films containing 10% HTPB in LDPE.

Oxygen absorption measurements were carried out on LDPE/Wax/HTPB/TiO$_2$ single layer and three-layer co-extrusion films prepared by film blowing in the manner described above for the LDPE/Wax/HTPB/TiO$_2$ cast films; provided, however, that for the three-layer structure, the films were cut into 3 gram sections, each of which contained 1 gram of scavenger layer. The final absorption for single layer blown film was similar (30 cc/g after 30 days) to cast film after 30 days for the composition of 10% HTPB (comprising 5% by weight of TiO$_2$ to the weight of HTPB). The quantity of absorption was about an average of 21 cc per gram of middle scavenger layer in three-layer co-extrusion blown film after 30 days.

Food-site migration testing in accordance with the Food and Drug Administration's (FDA) testing scheme was performed on three-layer co-extrusion film for food types such as dry chicken, bacon, bacon bits, cheese, and other foods, at room, refrigerator, and freezer temperatures. Food-side migration testing using FDA Condition of Use E (i.e., 10 days at 40° C.) was performed on samples having 95% ETOH food simulant and the corresponding extract was analyzed by gas chromatography-mass spectrometry (GC-MS) and high-performance liquid chromatography-mass spectrometry (HPLC-MS). The migration testing study indicated the packaging film is FDA regulatory compliant for the intended food packaging applications. All compounds detected were either below FDA threshold of migration and/or are FDA sanctioned additives to food contact (i.e., hindered phenol type antioxidants such as IRGAFOS®, 168 (BASF), IRGANOX® 1076 (BASF), or the like).

Butadiene Polymers

The compositions also comprise a butadiene polymer. In certain embodiments, the compositions herein comprise from about 5 weight percent to about 30 weight percent, preferably from about 6 weight percent to about 25 weight percent, and more preferably from about 10 weight percent to about 20 weight percent of a butadiene polymer.

In certain embodiments, the butadiene polymer is a polybutadiene polymer that may be unfunctionalized or functionalized. In certain embodiments, the polybutadiene polymer is an unfunctionalized polybutadiene. In certain alternative embodiments, the polybutadiene polymer is a functionalized end group polybutadiene. In certain embodiments, the polybutadiene polymer is hydroxyl terminated polybutadiene (HTPB). In certain embodiments, the polybutadiene polymer epoxy terminated polybutadiene. In certain embodiments, the polybutadiene polymer carboxy terminated polybutadiene.

In certain embodiments, the butadiene polymer is a low molecular weight functionalized or unfunctionalized polybutadiene polymer. In certain embodiments, the butadiene polymer is a liquid low molecular weight functionalized or unfunctionalized polybutadiene polymer.

In certain embodiments, the butadiene polymer is a functionalized or unfunctionalized polybutadiene having a number average molecular weight of about 500 or greater. In certain embodiments, the butadiene polymer is a functionalized or unfunctionalized polybutadiene having a weight average molecular weight of about 500 or greater.

In certain embodiments, the butadiene polymer is a functionalized or unfunctionalized polybutadiene having a number average molecular weight of about 1,000 or greater. In certain embodiments, the butadiene polymer is a functionalized or unfunctionalized polybutadiene having a weight average molecular weight of about 1,000 or greater.

In certain embodiments, the butadiene polymer is a low molecular weight unfunctionalized polybutadiene. In certain embodiments, the butadiene polymer is a liquid low molecular weight unfunctionalized polybutadiene.

In certain embodiments, the butadiene polymer is a low molecular weight functionalized polybutadiene. In certain embodiments, the polybutadiene polymer is a liquid low molecular weight functionalized polybutadiene.

In certain embodiments, the butadiene polymer is a solid butadiene polymer. In certain embodiments, the butadiene polymer is a solid polybutadiene polymer.

In certain embodiments, the butadiene polymer is a solid polybutadiene polymer having an average molecular weight ($M_n$) in the range of from about 60,000 to about 200,000, more preferably about 70,000 to about 100,000.

In certain embodiments, the butadiene polymer is a liquid polybutadiene polymer.

In certain embodiments, the butadiene polymer is a liquid polybutadiene polymer having an average molecular weight ($M_n$) in the range of from about 500 to about 50,000.

In certain embodiments, the butadiene polymer is a liquid polybutadiene polymer having an average molecular weight ($M_n$) in the range of from about 500 to about 5,000, e.g., 1,000, 2,300, 2,600, 2,800, 3,900, 4,300, and 5,000.

In certain embodiments, the butadiene polymer is a liquid polybutadiene polymer having an average molecular weight ($M_n$) in the range of from about 500 to about 5,000.

In certain embodiments, the butadiene polymer is a liquid polybutadiene polymer having an average molecular weight ($M_n$) in the range of from about 500 to about 3,000.

In certain embodiments, the butadiene polymer is a liquid polybutadiene polymer having an average molecular weight ($M_n$) in the range of from about 1,000 to about 3,000.

In certain embodiments, the butadiene polymer is a polybutadiene polymer having a relatively high trans content and low vinyl content. In certain embodiments the butadiene polymer is HTPB having 60% trans, 20% cis, and 20% vinyl content with a number average molecular weight of $M_n=2800$.

In certain embodiments, the butadiene polymer is a homopolymer of butadiene. Alternatively, the butadiene polymer is a butadiene copolymer. The copolymers may be a random copolymer, alternating copolymer, block copolymer, or graft copolymer. In certain embodiments, the butadiene copolymer is a copolymer of butadiene and at least one monomer copolymerizable with the butadiene monomer. Exemplary monomers copolymerizable with the butadiene monomer include, but are not limited to isoprene, acrylonitrile, and styrene.

The butadiene copolymers may be unfunctionalized or functionalized. In certain embodiments, the butadiene polymer is a butadiene copolymer having functionalized end groups. In certain embodiments, the functionalized end groups are selected from the group consisting of hydroxyl, epoxy, and carboxy groups.

In certain embodiments, the butadiene copolymers are a low molecular weight functionalized or unfunctionalized butadiene copolymers. In certain embodiments, the butadiene copolymers are liquid low molecular weight functionalized or butadiene copolymers.

In certain embodiments, the butadiene copolymer is a functionalized or unfunctionalized butadiene copolymer having a number average molecular weight of about 500 or greater. In certain embodiments, the butadiene copolymer is a functionalized or unfunctionalized butadiene copolymer having a weight average molecular weight of about 500 or greater.

In certain embodiments, the butadiene copolymer is a functionalized or unfunctionalized butadiene copolymer having a number average molecular weight of about 1,000 or greater. In certain embodiments, the butadiene copolymer is a functionalized or unfunctionalized butadiene copolymer having a weight average molecular weight of about 1,000 or greater.

In certain embodiments, the butadiene copolymer is a low molecular weight unfunctionalized butadiene copolymer. In certain embodiments, the butadiene polymer is a liquid low molecular weight unfunctionalized butadiene copolymer.

In certain embodiments, the butadiene copolymer is a low molecular weight functionalized butadiene copolymer. In certain embodiments, the butadiene copolymer is a liquid low molecular weight functionalized butadiene copolymer.

In certain embodiments, the butadiene copolymer is a solid butadiene copolymer.

In certain embodiments, the butadiene copolymer is a solid butadiene copolymer having an average molecular weight ($M_n$) in the range of from about 60,000 to about 200,000, more preferably about 70,000 to about 100,000.

In certain embodiments, the butadiene copolymer is a liquid butadiene copolymer.

In certain embodiments, the butadiene copolymer is a liquid butadiene copolymer having an average molecular weight ($M_n$) in the range of from about 500 to about 50,000.

In certain embodiments, the butadiene copolymer is a liquid butadiene copolymer having an average molecular weight ($M_n$) in the range of from about 500 to about 5,000.

In certain embodiments, the butadiene copolymer is a liquid butadiene copolymer having an average molecular weight ($M_n$) in the range of from about 500 to about 3,000.

In certain embodiments, the butadiene copolymer is a liquid butadiene copolymer having an average molecular weight ($M_n$) in the range of from about 1,000 to about 3,000.

Titanium Dioxide Catalyst

The compositions also comprise $TiO_2$ photocatalyst in an amount effective to provide a desired oxygen scavenging effect. Such amounts may vary depending on a number of factors, including the shelf life of the product to be packaged, the oxygen-sensitivity of the product to be packaged, and so forth. In certain embodiments, for the compositions prepared in accordance with the solution techniques as described herein (e.g., solution casting and electrospinning), the amount of $TiO_2$ in the oxygen scavenging composition is in the range of from about 1 percent to about 5 percent by weight, preferably about 2 percent to about 4 percent by weight, e.g., about 3 percent by weight, based on the total weight of the blend. In certain embodiments, for the compositions prepared in accordance with the melt techniques as described herein (e.g., extrusion and reactive melt extrusion), the amount of $TiO_2$ in the oxygen scavenging composition is in the range of from about 1 percent to about 5 percent by weight, preferably about 2 percent to about 4 percent by weight, e.g., about 3 percent by weight, based on the weight of the butadiene polymer. In certain embodiments, the $TiO_2$ has purity of greater than 99.5%, trace metal basis, with 21 nm primary particle sizes with approximately 80% anatase and 20% rutile. In certain embodiments, $TiO_2$ has anatase, rutile, brookite or a combination of polymorphs. Generally, although anatase form requires higher light energy to be activated, it shows more photocatalytic performance superior to that of the more stable rutile. In certain embodiments, doping, the use of heterogeneous systems with other semiconductors, application of synergic effects with inorganic metal nanoparticles or organic material, or dye sensitization methods can be applied to extend the spectral response of $TiO_2$ to include the visible light region. In certain embodiments, $TiO_2$ is doped with a noble metal (including but not limited to gold, silver, and platinum), a transition metal (including but not limited to iron, copper, chromium, manganese, and nickel, or a non-metal (including but not limited to nitrogen, fluorine, carbon, and sulfur) to change the bandgap from near-visible to the visible region. In certain embodiments, $TiO_2$ can be coupled or replaced with other semiconductors photocatalysts, including but not limited to, iron (III) oxide ($Fe_2O_3$), cadmium sulfide (CdS), tungsten oxide ($WO_3$), or zinc oxide (ZnO).

Polyethylene

In certain embodiments, the polyethylene may be low density polyethylene (LDPE) or linear low density polyethylene (LLDPE) with a wide range of WI. In certain embodiments, the MFI of the polyethylene is in the range of about 0.5 to 25 g/min. In certain embodiments, the polyethylene composition comprises a blend of two or more grades of polyethylene.

Other Components

In certain embodiments, the polymer composition may contain other components, including colorants (pigments and dyes), fillers, extenders, UV absorbers, anti-block agents, anti-slip agents, and/or compatibilizers. In certain embodiments, such other components are added to the polymer composition of the non-oxygen scavenging layers.

In certain embodiments, a photo-initiator, such as benzophenone, may be added to the composition to accelerate or trigger the oxygen absorption. It is recognized that other UV or visible light photo-initiators are contemplated, including but not limited to, acetophenone, valerophenone, and titanocene.

Articles of Manufacture

In certain aspects, articles of manufacture comprising the oxygen scavenging compositions herein are provided. Various articles can be prepared from the disclosed compositions. Exemplary articles include films, such as flexible sheet films, flexible bags, and pouches. Exemplary articles also include vessels, such as rigid and semi-rigid containers, e.g., bottles or the like. In certain embodiments, the flexible films and bags include those of the type used to package various food items. Such flexible films and bags and can be made up of one or more layers to form the overall film or bag-like packaging material. The composition of the present invention can be used in any one or more of the layers of such packaging material. In certain embodiments having multiple layers, such layers may be separately formed and laminated, e.g., with an adhesive or tie layer. In certain embodiments having multiple layers, one or more layers may be separately formed and one or more layers may be laminated thereto via an extrusion lamination or extrusion coating process. In certain embodiments having multiple layers, two or more layers may be formed together by a co-extrusion process.

In certain embodiments, the oxygen scavenging compositions herein comprise as an integral part of the packaging structure. Additionally, and/or alternatively, articles formed of the oxygen scavenging compositions herein comprise a nonintegral component of a packaging article such as, for example, a liner, insert, sealant, sachet, fibrous mat insert, or the like.

FIGS. 5 through 9 illustrate exemplary embodiments of a first oxygen scavenging film structure 100 usable for direct or indirect contact with food. In certain embodiments, the first film structure 100a has a total thickness of between 25-300 microns.

Figure 5:
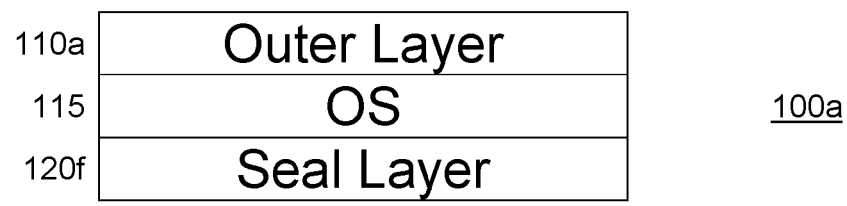
FIG. 5 is a side cross sectional view of a first embodiment of a first film structure having an outer layer, oxygen scavenging composition layer, and seal layer.

FIG. 5 illustrates a first embodiment film structure 100a comprising an outer layer 110a formed of a polymer composition disposed on one side of an oxygen scavenging layer formed of an oxygen scavenging composition 115 in accordance with the present disclosure. The outer layer may be formed of a base polymer as described above of, or a polymer that is otherwise compatible with the oxygen scavenging layer 115. A seal layer 120f (e.g., a heat sealant layer) is likewise formed of a base polymer or polymer composition that is compatible with the oxygen scavenging layer 115 and is disposed opposite the outer layer. In certain embodiments, the seal layer 120f is formed of the same polymer as the outer layer 110a. In alternative embodiments, the seal layer 120f is formed of a different polymer from the outer layer 110a. Although the structure is illustrated with one outer layer 110a, it will be recognized that other numbers of such layers formed may be included, including abuse layers, gas and/or moisture barrier layers, adhesive layers, tie layers, print or ink layers, etc. In certain embodiments, the first film structure 100a the sealant layer 120f is configured to come into direct contact with food or other contends of a packaging structure formed of the film structure 110a, and the oxygen scavenging layer 115 does not come into direct contact with any food or other packaging contents.

Figure 6:
FIG. 6 is a side cross sectional view of a second embodiment of a first film structure having an oxygen scavenging composition layer and a seal layer.

FIG. 6 illustrates a second embodiment film structure 100b comprising an oxygen scavenging composition layer 115 and a seal layer 120f formed of a polymer material as described above. In certain embodiments, seal layer 120f is disposed on an inward facing surface, wherein a packaging structure formed of the film structure 100b is configured for indirect contact between any food or other packaged contents and the oxygen scavenging composition layer 115.

Figure 7:
FIG. 7 is a side cross sectional view of a third embodiment of a first film structure having an outer layer and an oxygen scavenging composition layer.

FIG. 7 illustrates a third embodiment structure 100c comprising an oxygen scavenging composition layer 115f and an outer layer 110a. In certain embodiments, the film structure 100c is configured for direct contact between any food or other packaged contents of a packaging structure formed of the film structure 100c and the oxygen scavenging composition layer 115f. Although the structure 100c is illustrated with one outer layer 110c, it will be recognized that other numbers of such layers, e.g., formed of a base polymer may be included.

Figure 8:
FIG. 8 is a side cross sectional view of a fourth embodiment of a first film structure, having an oxygen scavenging composition layer.
Figure 9:
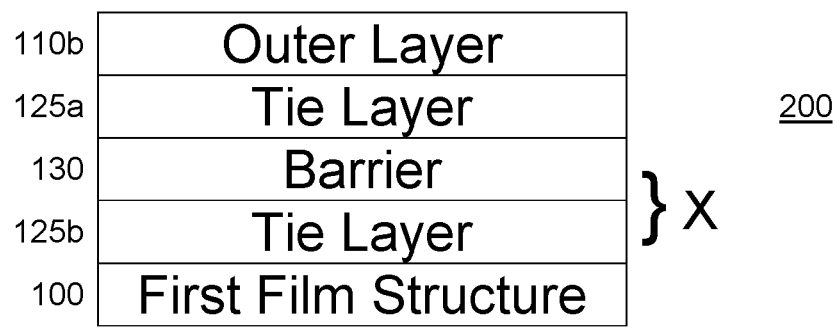
FIG. 9 is a side cross sectional view of an exemplary embodiment of a second film structure, having an outer layer, tie layers, barrier layer, and a first film structure.

FIG. 8 illustrates a fourth embodiment film structure 100d comprising an oxygen scavenging composition layer 115f. In certain embodiments, the first film structure 100d is configured to provide direct contact between any food or other packaged contents and the oxygen scavenging composition layer 115f in a packaging article formed of the film 100d, FIG. 9 illustrates a fifth embodiment film structure 200 comprising an outer layer 110b, a first tie layer 125a, a barrier layer 130 for preventing or reducing the transmission of oxygen or other gas molecules or moisture vapor, a second tie layer 125b, and the first film structure 100. The first film structure may be, e.g., one of the film structures described above by way of reference to FIGS. 5-9. Although a five-layer structure is illustrated, it will be recognized that other numbers of layers, including seven-layer, nine-layer, and others are also contemplated. In certain embodiments, additional pairs of tie layers and barrier layers X are included. In certain embodiments, the second film structure 200 has a total thickness of between 25-300 microns. The tie layers 125a, 125b may be any suitable tie resin or adhesion promotor as would be known by persons skilled in the art. Exemplary tie layers include maleic anhydride (MAH) tie resins and others. Exemplary barrier layer compositions 130 include gas barriers to prevent or reduce the transmission of oxygen or other gas molecules through the film. Exemplary gas barrier layers include ethylene-vinyl alcohol (EVOH), polyvinyl alcohol (PVOH), polyamides, e.g., polyamide nylon (PA) (e.g., polyamide nylon 6 (PA6)). Likewise, the barrier layer 130 may also include moisture barrier layers, such as high density polyethylene (HDPE), medium density polyethylene (MDPE), low density polyethylene (LDPE), linear polyethylenes such as linear low density polyethylene (LLDPE), and blends thereof.

The first and second film structures may each be laminated or coated for a final film application.

All references cited herein are incorporated herein by reference in their entireties.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof

What is claimed is:

1. A composition of matter having oxygen scavenging properties, comprising a blend of:
   a base polymer;
   a hydroxyl terminated polybutadiene having a number average molecular weight ($M_n$) in the range of from about 500 to about 10,000; and
   titanium dioxide in an amount sufficient to catalyze reaction of oxygen with the hydroxyl terminated polybutadiene, wherein the titanium dioxide is selected from the group consisting of titanium dioxide having an average particle size of 10 nanometers to 20 microns, titanium dioxide which has been subject to doping, heterogeneous systems comprising titanium dioxide in combination with other semiconductors, titanium dioxide in combination with inorganic metal nanoparticles or organic material, dye-sensitized titanium dioxide, and any combination thereof.

2. The composition of claim 1, wherein the hydroxyl terminated polybutadiene is present in an amount of from 5 to 20 percent by weight based on the weight of the composition.

3. The composition of claim 1, wherein the titanium dioxide is present in an amount selected from the group consisting of:
   1 to 5 percent by weight based on the weight of the composition; and
   1 to 5 percent by weight based on the weight of the hydroxyl terminated polybutadiene.

4. The composition of claim 1, wherein the composition does not include a curing agent.

5. The composition of claim 1, wherein the hydroxyl terminated polybutadiene is a liquid at room temperature.

6. The composition of claim 1, wherein the hydroxyl terminated polybutadiene has a number average molecular weight ($M_n$) in the range of from 500 to 8,000.

7. The composition of claim 1, wherein the hydroxyl terminated polybutadiene has one or both of a relatively high trans content and a relatively low vinyl content.

8. The composition of claim 7, wherein the hydroxyl terminated polybutadiene has a trans content of about 60%, a cis content of about 20%, and a vinyl content of about 20%.

9. The composition of claim 1, wherein the titanium dioxide is present in an amount sufficient to catalyze reaction of oxygen with the hydroxyl terminated polybutadiene wherein moisture is not necessary to activate the reaction.

10. The composition of claim 1, wherein the titanium dioxide is present in an amount sufficient to catalyze reaction of oxygen with the hydroxyl terminated polybutadiene in the absence of direct ultraviolet radiation.

11. The composition of claim 1, wherein the hydroxyl terminated polybutadiene has a number average molecular weight ($M_n$) in the range of from about 500 to about 5,000.

12. The composition of claim 1, wherein the hydroxyl terminated polybutadiene has a number average molecular weight ($M_n$) in the range of from about 1,000 to about 3,000.

13. The composition of claim 1, further comprising a UV or visible light photoinitiator.

14. The composition of claim 13, wherein the UV or visible light photoinitiator is selected from the group consisting of benzophenone, acetophenone, valerophenone, and titanocene.

15. The composition of claim 1, wherein the titanium dioxide is doped with a doping agent selected from the group consisting of noble metal, a transition metal, and a non-metal.

16. The composition of claim 1, wherein the titanium dioxide is titanium dioxide having an average particle size of 10 nanometers to 20 microns.

17. The composition of claim 1, wherein the base polymer is ethyl cellulose.

18. The composition of claim 17, wherein the composition is in a form selected from the group consisting of a solution cast film and a fibrous mat.

19. The composition of claim 18, wherein the composition is prepared from a solvent mixture comprising the base polymer, the hydroxyl terminated polybutadiene, the titanium dioxide, and a solvent system, wherein the solvent system is selected from the group consisting of a toluene/ethanol solvent system and an ethanol/water solvent system.

20. The composition of claim 17, wherein the composition is prepared by a technique selected from the group consisting of solution casting and electrospinning.

21. The composition of claim 17, wherein the composition is in the form of a fibrous mat having fibers with a diameter in the range of from about 0.3±0.1 microns to about 0.6±0.2 microns.

22. The composition of claim 17, wherein the composition does not include a curing agent.

23. The composition of claim 1, wherein the base polymer is a polyester.

24. The composition of claim 23, wherein the polyester is polylactic acid (PLA).

25. The composition of claim 23, wherein the composition is prepared by reactive melt extrusion of the polyester with the hydroxyl terminated polybutadiene and the titanium dioxide.

26. The composition of claim 1, wherein the base polymer is a polyolefin.

27. The composition of claim 26, wherein the polyolefin is low density polyethylene (LDPE).

28. The composition of claim 27, further comprising a hydrocarbon wax for improving dispersion of the hydroxyl terminated polybutadiene in the low density polyethylene.

29. The composition of claim 26, wherein the composition is prepared by melt blending.

30. The composition of claim 26, wherein the polyolefin is linear low density polyethylene (LLDPE).

31. A packaging film structure, comprising:
an oxygen scavenging layer comprising a blend of a base polymer, a hydroxyl terminated polybutadiene having a number average molecular weight ($M_n$) in the range of from about 500 to about 10,000, and titanium dioxide in an amount sufficient to catalyze reaction of oxygen with the hydroxyl terminated polybutadiene, wherein the titanium dioxide is selected from the group consisting of titanium dioxide having an average particle size of 10 nanometers to 20 microns, titanium dioxide which has been subject to doping, heterogeneous systems comprising titanium dioxide in combination with other semiconductors, titanium dioxide in combination with inorganic metal nanoparticles or organic material, dye-sensitized titanium dioxide, and any combination thereof.

32. The packaging film structure of claim 31, further comprising one or both of an outer layer and a heat sealant layer.

33. The packaging film structure of claim 32, wherein one or both of the outer layer and a heat sealant layer comprises the base polymer.

34. The packaging film structure of claim 31, further comprising a barrier layer selected from a gas barrier layer and a moisture barrier layer.

35. The packaging film structure of claim 31, wherein the titanium dioxide is titanium dioxide having an average particle size of 10 nanometers to 20 microns.

\* \* \* \* \*